(No Model.)
F. J. CLAMER & J. G. HENDRICKSON.
METHOD OF PROTECTING THE NEGATIVE PLATES OF ELECTRICAL BATTERIES.
No. 397,489. Patented Feb. 12, 1889.
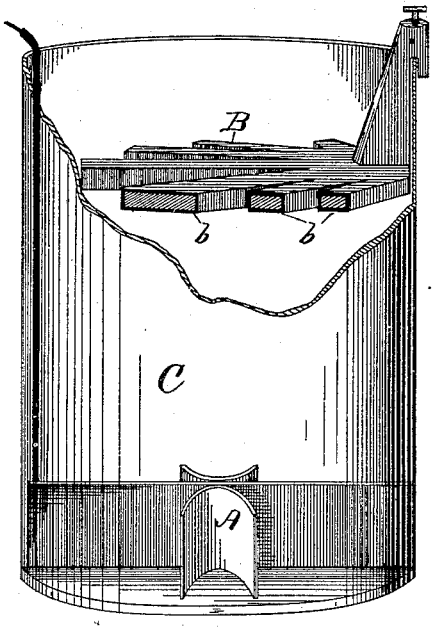
Witnesses:
Chas. S. Kalb
W. Buchanan
Inventors:
Francis J. Clamer
and Jos. G. Hendrickson
By J. N. Kalb
Asso. Atty.

UNITED STATES PATENT OFFICE.

FRANCIS J. CLAMER AND JOSEPH G. HENDRICKSON, OF PHILADELPHIA, PENNSYLVANIA.

METHOD OF PROTECTING THE NEGATIVE PLATES OF ELECTRICAL BATTERIES.

SPECIFICATION forming part of Letters Patent No. 397,489, dated February 12, 1889.

Application filed June 23, 1888. Serial No. 278,017. (No specimens.)

*To all whom it may concern:*

Be it known that we, FRANCIS J. CLAMER and JOSEPH G. HENDRICKSON, both citizens of the United States, residing at Philadelphia, in the county of Philadelphia and State of Pennsylvania, have invented certain new and useful Improvements in the Method of Protecting the Metal Plates of Galvanic Batteries; and we do declare the following to be a full, clear, and exact description of the invention, such as will enable others skilled in the art to which it appertains to make and use the same, reference being had to the accompanying drawing, and to the letters and figures of reference marked thereon, which form a part of this specification.

The object of our invention is to protect the metallic plate forming the negative pole of a galvanic battery from the corrosive action of the acid in which it is immersed. We accomplish this object by covering the surface of the metal plate with a lead coating which is not affected by the acid.

In a galvanic battery constructed in the ordinary way the unprotected zinc plates forming the negative pole of the battery are immersed in the acid solution. As a consequence the surface is soon covered with a refuse that very much impedes the galvanic action of the acid, and the said plates are quickly corroded or eaten away, requiring to be replaced by new ones. When these metallic plates are covered with lead before being immersed, the corroding action is almost entirely overcome, and we have found that the galvanic action is in no wise interfered with—in fact, the flow of the electrical current is made more even and regular, while the plates themselves are almost indestructible. To cover the metallic plates, we find the best results are obtained when the metal forming the lead coating is prepared in accordance with the specifications of the patent granted to Francis J. Clamer August 14, 1883, and numbered 283,077, which consists in subjecting the molten lead to the action of sal-ammoniac, arsenic, and phosphate of lead. When the plates are removed from the lead bath, they should be immediately immersed in cold water, which will have the effect of producing a spongy surface on the lead coating. Where the wires conveying the electrical current are attached to these metallic plates, the surface thereof must not be coated with the lead.

The accompanying drawing, which represents a perspective view of an ordinary crowfoot battery with the upper part of the jar broken out and several of the toes of the crowfoot shown in section, will serve to illustrate our invention, it being understood of course that the invention can be applied to any form of battery.

In the drawing the jar is marked C and the copper or positive pole is marked A, and B is the negative or zinc pole, the lead coating thereof being designated by the letter $b$ in the sections of the toes.

Having thus described our invention, what we claim as new, and desire to secure by United States Letters Patent, is—

1. The herein-described process of protecting the negative plate of an electrical battery, which consists in coating the surface of said plates with lead.

2. The herein-described process of protecting the negative plate of an electrical battery, which consists in first subjecting lead to the action of sal-ammoniac, arsenic, and phosphate of lead, and then coating the surface of said negative pole with the lead thus prepared, as set forth.

In testimony whereof we affix our signatures in presence of two witnesses.

FRANCIS J. CLAMER.
    JOSEPH G. HENDRICKSON.

Witnesses:
 THOMAS D. MOWLDS,
 GEO. H. RAPSON.